United States Patent [19]
Robertson et al.

[11] Patent Number: 5,802,956
[45] Date of Patent: Sep. 8, 1998

[54] METHOD AND APPARATUS FOR THE REMOVAL OF KRAEUSEN IN THE BREWING PROCESS

[76] Inventors: David Henry Robertson, 2919 Silver Falls; Landry Edward Bonnette, 2135 Lake Hills Dr., Apt. 2103, both of Kingwood, Tex. 77339

[21] Appl. No.: 621,351

[22] Filed: Feb. 25, 1996

[51] Int. Cl.⁶ ..................................................... C12C 5/00
[52] U.S. Cl. .............................. 99/276; 99/278; 435/812
[58] Field of Search .................................. 99/277, 277.1, 99/277.2, 278; 215/231; 435/812; 203/20; 220/216

[56] References Cited

U.S. PATENT DOCUMENTS

| | | | |
|---|---|---|---|
| 1,893,411 | 1/1933 | Hallermann | 435/812 |
| 3,679,600 | 7/1972 | Hahm | 435/812 |
| 4,329,918 | 5/1982 | Kuhtreiber | 99/276 |
| 4,750,975 | 6/1988 | Parker et al. | 203/20 |

OTHER PUBLICATIONS

Wammack, Sam; Why? How? 10 Good Brewing Questions, Answers Included; Brew Your Own Mar. 1996, pp. 31–41.

Primary Examiner—Reginald L. Alexander
Attorney, Agent, or Firm—Gunn & Associates, P.C.

[57] ABSTRACT

A method and apparatus for the removal of foam produced in the primary fermentation step of home brewmaking comprises primarily a kraeusen trap including a platform of a diameter slightly less than the inside diameter of a primary fermenter and one or more chimneys to permit the flow of foam from below the platform to the top surface of the platform. The device may also include means for maintaining a space between the perimeter of the platform and the inside surface of the primary fermenter. This space permits foam to flow around the platform to the top surface of the platform, and for beer brought with the foam to settle back into the batch. Each of the one or more chimneys may also include one or more drain holes for the flow of beer into the batch. The space between the platform and the inside diameter of the primary fermented is preferably maintained by a plurality of spacers, which preferably clip onto the perimeter of the platform.

16 Claims, 4 Drawing Sheets

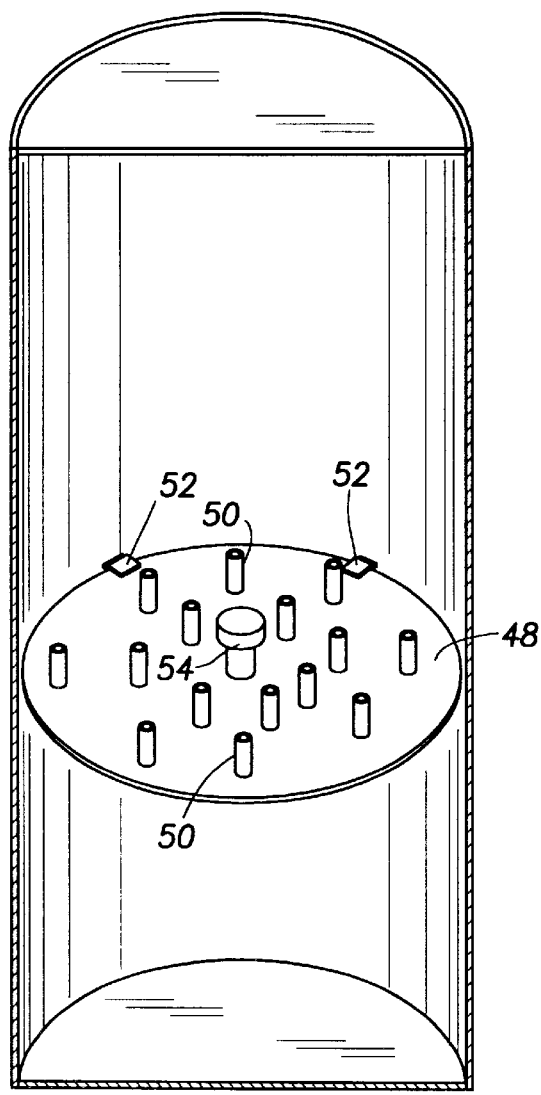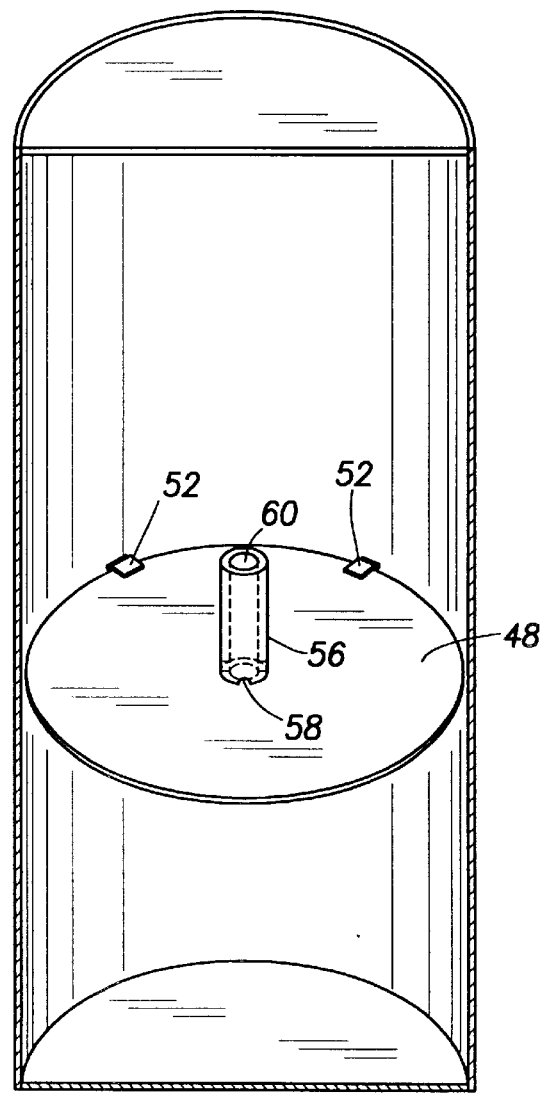

METHOD AND APPARATUS FOR THE REMOVAL OF KRAEUSEN IN THE BREWING PROCESS

FIELD OF THE INVENTION

The present invention relates generally to the field of home brewing of beer, and, more particularly, to a method and apparatus to remove surface foam in the primary fermentation stage of brewing beer.

BACKGROUND OF THE INVENTION

Ever since being legalized in the United States in 1978, home brewing of beer has become increasingly popular. Home brewing offers a high-quality beer at a reasonable price, and affords the home brewer an opportunity to produce a distinctive product.

Brewing beer, in general, requires four steps: (1) "cooking the wort," in which the liquid for fermentation is prepared; (2) primary fermentation; (3) secondary fermentation; and finally (4) bottling. Each of these steps has rather strict requirements of sanitation, temperature, precision in mixing the recipe, measuring specific gravity, and time for various stages included within each step.

The primary fermentation step is often carried out in a food grade bucket. The fermentation produces a foam, also known as kraeusen, at the top surface of the brew and this foam contains harshly bitter hop resins and cold-break trub. Removal of the foam results in a better tasting beer, but since the liquid walls of the foam bubbles are beer, removing the foam by known methods wastes a lot of the beer.

One known method of removing the foam is the so-called "blow-over" method of fermentation. In this method, the beer is started in a closed, five-gallon (or so) primary fermenter, usually of a sanitary plastic material. There is little room for foam during active fermentation, so a blow-over tube is used to allow foam to flow into another container to be discarded. As much as a half-gallon of beer goes off along with the foam. Further, there generally remains a volume space above the brew and below the blow-over tube that still contains foam. Thus, this technique is not entirely successful in eliminating the unwanted kraeusen at this stage.

One proposed method of saving some of the wasted beer involves primary fermentation in a open container, such as a food-grade plastic bucket. A lid is placed loosely over the container, but not sealed. The foam is allowed to rise, then decline. In this method, some of the beer settles back into the batch. Unfortunately, so do the hop resins and cold-break trub. When primary fermentation is complete, the beer is siphoned into a five-gallon carboy, leaving the condensed hop resin, yeast, and trub spooge in the primary fermenter. Since this method permits some of the undesirable components of the fermentation process to settle back into the batch, undesirable effects on the taste of the beer result, not to mention the possibility of total contamination of the batch.

Thus, there remains a need for a simple, yet effective, means of removing the foam resulting from the primary fermentation step of home brewmaking, without sacrificing much of the beer when the foam is removed. Such an apparatus and method should be easily adaptable to existing home brewmaking setups, so that little additional expense is incurred in adopting this apparatus and method. Further, the system should be easy to use and not interrupt the process of making the beer, and the system should not compromise the sanitation of the system that is already in place for making beer.

SUMMARY OF THE INVENTION

The present invention solves these and other drawbacks of the prior art of home brewmaking. The device of the present invention comprises primarily a kraeusen trap including a platform of a diameter slightly less than the inside diameter of a primary fermenter and one or more chimneys to permit the flow of foam from below the platform to the top surface of the platform.

The device may also include means for maintaining a space between the perimeter of the platform and the inside surface of the primary fermenter. This space permits foam to flow around the platform to the top surface of the platform, and for beer brought with the foam to settle back into the batch. Each of the one or more chimneys may also include one or more drain holes for the flow of beer into the batch. The space between the platform and the inside diameter of the primary fermented is preferably maintained by a plurality of spacers, which preferably clip onto the perimeter of the platform.

As the beer from the foam drains back into the batch, the foam forms a gelid mass on top of the platform. When the primary fermentation step is complete, the platform is simply removed from the primary fermenter, with the foam intact. Alternatively, in a preferred embodiment, a center chimney is large is enough to accommodate a siphon hose, so that the beer can be siphoned off with the platform in place. When the siphoning stage is complete, the platform and foam are removed from the primary fermenter and then cleaned, ready for the next batch.

A preferred embodiment of the present invention includes a pair of substantially parallel, spaced-apart plates to form the platform. Foam is directed to the top surface of the platform through one or more vent chimneys. One or more drain holes permit uncontaminated beer to drain to the space between the plates. A valve rod, penetrating both plates to a level below the surface of the batch, may then be pulled up to release beer from the space between the plates down into the batch.

This apparatus and method are simple, yet effective, means of removing the foam resulting from the primary fermentation step of home brewmaking, without sacrificing much of the beer when the foam is removed. The device is simple and easy to construct, with few parts to be assembled. It is also adapted to fit into most existing home brewmaking setups, so that little additional expense is incurred in adopting the device. It is easy to use and does not interrupt the process of making the beer. Finally, the system does not compromise the sanitation of the system that is already in place for making beer, requiring only the same sanitization of the rest of the brewing setup.

These and other features of the present invention will be apparent to those of skill in the art from a review of the following detailed description along with the accompanying drawings.

BRIEF DESCRIPTION OF THE DRAWINGS

FIG. 3 depicts an isometric view of a preferred, single-plate embodiment of the present invention, showing a plurality of spaced, foam-vent chimneys.

FIG. 4 depicts an isometric view of a preferred, single-plate embodiment of the present invention, showing a single, centrally located foam-vent chimney.

DETAILED DESCRIPTION OF PREFERRED EMBODIMENTS

The present invention is based upon the discovery that advantages may be obtained by placing a barrier on the top surface of a batch in the primary fermentation stage of home brewing of beer to retain the foam produced during fermentation while allowing the beer to drain back into the batch.

Figure 1:
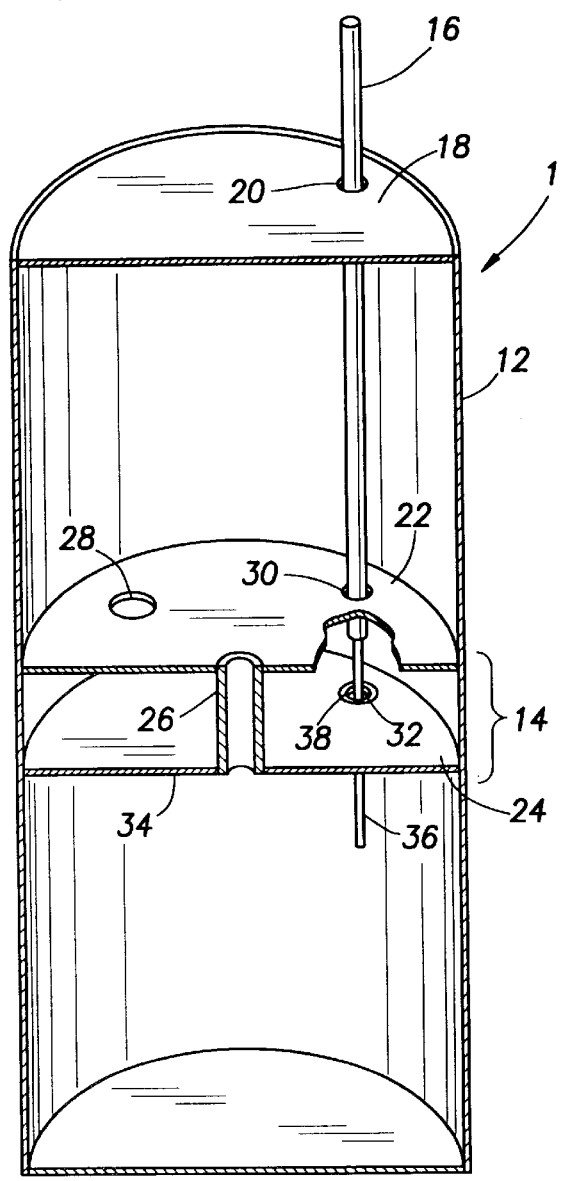
FIG. 1 depicts an isometric view of a preferred, double-plate embodiment of the present invention, showing the system in a closed condition.

FIG. 1 depicts a currently preferred embodiment of such a barrier employed in a home brewing setup 10. The setup 10 comprises a primary fermentation container 12, a platform 14 and a valve rod 16. The container 12 may also include an optional cover 18 with a hole 20 therethrough.

The container 12 may be of any appropriate food-grade material, such as a light-weight plastic, well known in the home brewing art. On the other hand, the platform 14 is preferably made of a relatively rigid, sanitary material that is easily molded or machined. The valve rod 16 should be formed of an easily extruded material, or it may even be made of glass.

The platform 14 comprises primarily a top plate 22, a bottom plate 24, and a foam-vent chimney 26 between the top plate 22 and bottom plate 24. The top plate 22 preferably includes at least one drain hole 28. However, the top plate 22 may include many drain holes, or the drain holes may be omitted and beer with then be allowed to drain below the top plate between the periphery of the top plate and the inside surface of the container 12.

The top plate also includes a sealed penetration 30 for the access of the valve rod 16 and the bottom plate 24 includes an aligned penetration 32. The operation of the valve rod 16 in conjunction with the penetrations 30 and 32 will be described in further detail below.

Figure 2:
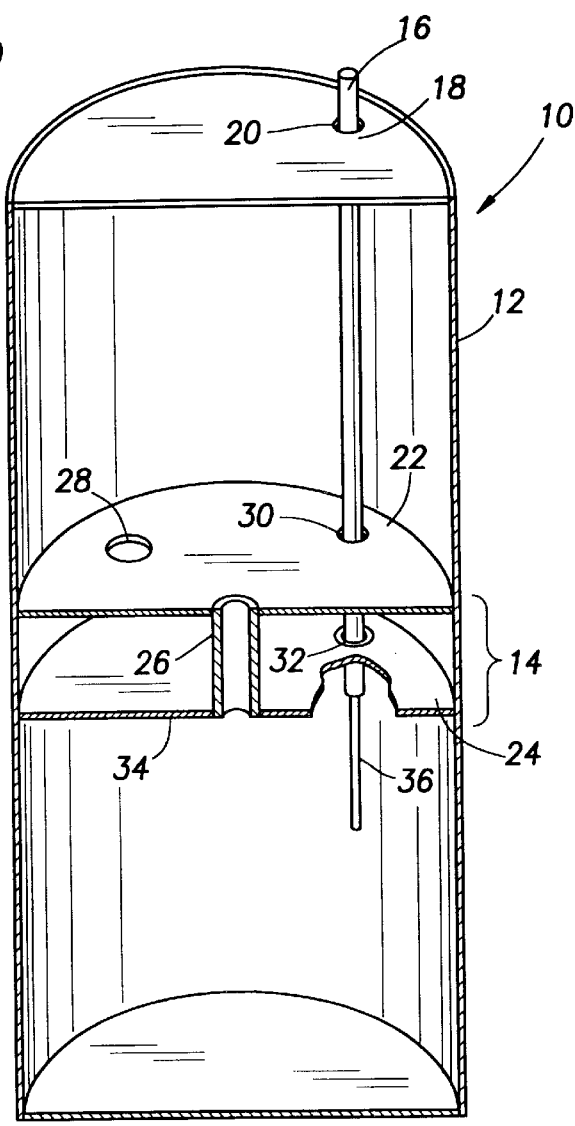
FIG. 2 depicts an isometric view of a preferred, double-plate embodiment of the present invention, showing the system in an open condition.

A gasket 34 surrounds the bottom plate 24 to seal between the bottom plate and the inside surface of the container 12. In operation, foam is vented up through the foam-vent chimney 26 and settles upon the top surface of the upper plate 22. As foam bubbles burst, releasing beer and leaving behind foam, the foam accumulates on the surface of the top plate and beer drains into the space between the plates through the drain hole 28. The beer is sealed by the plates when the valve rod 16 is in a lower position, as shown in FIG. 2. FIG. 2 shows the setup in a closed condition. The valve rod includes a reduced diameter segment 36, and, when the valve rod is raised to the open position, as shown in FIG. 1, the reduced diameter segment 36 is brought in registration with a gasket 38, allowing the beer that is between the plates to drain back into the wort below the platform.

Figure 2A:
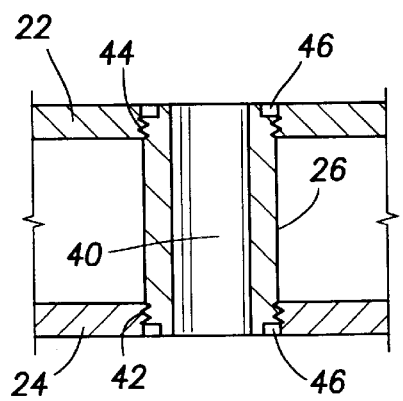
FIG. 2a depicts additional details of the double-plate platform.

FIG. 2a depicts additional details of the dual-platform embodiment of the present invention. As previously described, the platform includes an upper plate 22, a lower plate 24, and a foam-vent chimney 26. The chimney 26 includes a passage 40 to provide communication for foam from below the lower plate to above the upper plate. To assemble the platform, the lower plate (with its gasket 34), may be placed in position on top of the wort. Then, the chimney 26 may be screwed into the lower plate with a set of threads 42. Finally, the top plate can be spun onto the chimney with a set of threads 44. Each of the threads 42 and 44 may include a countersink 46 to limit the travel of the respective plate on the threads. Alternatively, the platform may be pre-assembled an simply placed in position. The platform is preferably capable of being disassembled for ease of cleaning between batches.

Figure 5A:
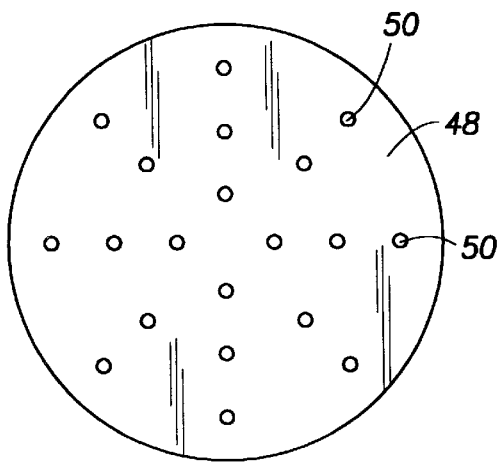
FIG. 5a depicts a top view.
Figure 5B:
FIG. 5b depicts a side view, of the multi-chimney platform of FIG. 3.
Figure 9A:
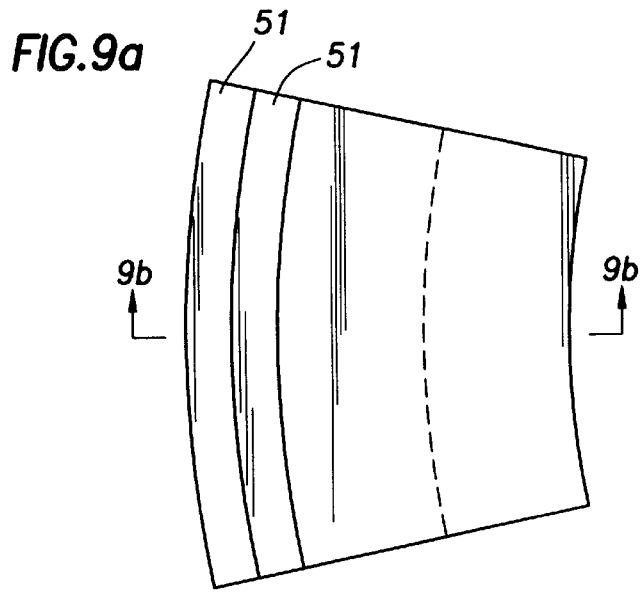
FIG. 9a depicts a top view.
Figures 9B, 9C:
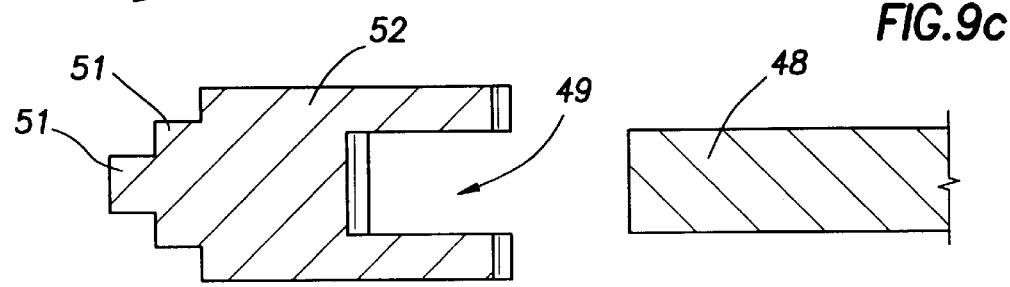
FIG. 9b depicts a side view of a peripheral spacer that may find application in the present invention.
FIG. 9c depicts a side view of the edge of a plate of any of the platforms of the present invention.

FIGS. 3 and 4 depict single-plate embodiments of the present invention. As shown in FIG. 3, the platform may comprise a single plate 48 with a plurality of chimneys 50. Further details of the plate 48 are shown in FIGS. 5a and 5b. The plate 48 may be held in place with a plurality of polymeric clips 52, shown in more detail in FIGS. 9a, 9b, and 9c. In a preferred embodiment, the clip 52 fits onto a plate 48 at an interior space 49. Once of skill in the art will recognize that, rather than a clip, the cross-section of FIGS. 9b and 9c may be a continuous gasket that seals around the entire periphery of the plate. The clip (or gasket) also includes a number of steps 51 to add pliability to the clip, so that the clip or gasket acts rather like a wiper. This helps to remove foam from the interior surface on the fermentation container, thus enhancing sanitation of the setup.

In addition to holding the plate 48 in place within the container, the clips also space the plate away from the inside surface of the container, developing a path for beer to drain back into the wort below the plate. As before, the chimneys 50 provide a vent path for foam to rise to a level above the plate where it is captured for later removal when the platform, with foam entrained thereon, is removed from the container at the completion of primary fermentation. For ease of removal, the plate may optionally include a centrally located handle 54.

Figure 6A:
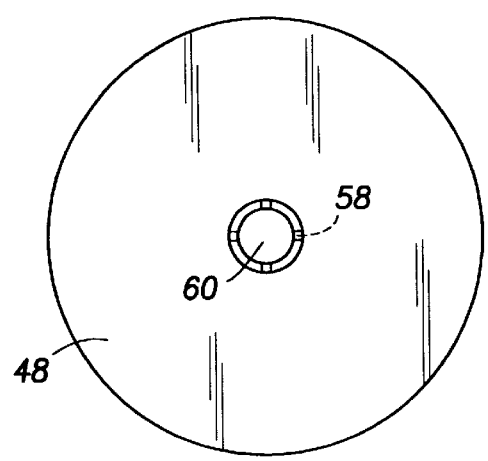
FIG. 6a depicts a top view.
Figure 6B:
FIG. 6b depicts a side view, of the single-chimney platform of FIG. 4.

As shown in FIG. 4, the plate 48 may include a single, centrally located chimney 56. Further details of the plate 48 in this embodiment are shown in FIGS. 6a and 6b. Along the base of the chimney 56 are a number of drain holes 58, which permit beer to drain into a passage 60 through the chimney 56. As before, the plate 48 may be held in place with a plurality of clips 52. The single-plate embodiments of FIGS. 3 and 4 have the advantage of simplicity, with fewer parts, and are thus less expensive to construct.

Figure 7A:
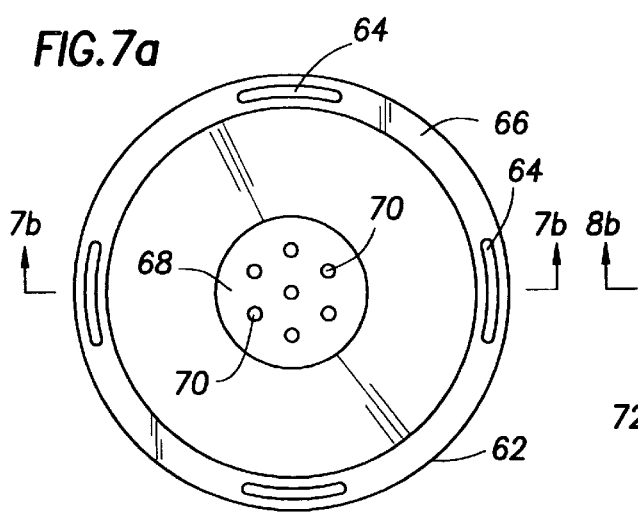
FIG. 7a depicts a top view.
Figure 7B:
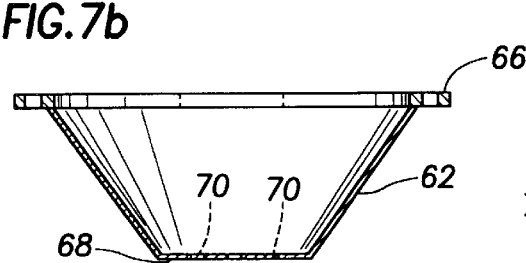
FIG. 7b depicts a side view of a frustoconically shaped basin that forms the platform of the present invention.

Rather than the flat plate design of FIGS. 3 and 4, the platform may be formed as a frustoconical basin 62, as shown in FIGS. 7a and 7b. The basin 62 includes a number of spaced, arcuate foam-vent holes 64, spaced about a rim 66. The basin 62 also includes a substantially flat bottom 68 with a plurality of drain holes 70 therethrough. In use, foam is vented through the holes 64, where it flows down into the basin 62. Beer is then allowed to drain back into the wort through the drain holes 70.

Figure 8A:
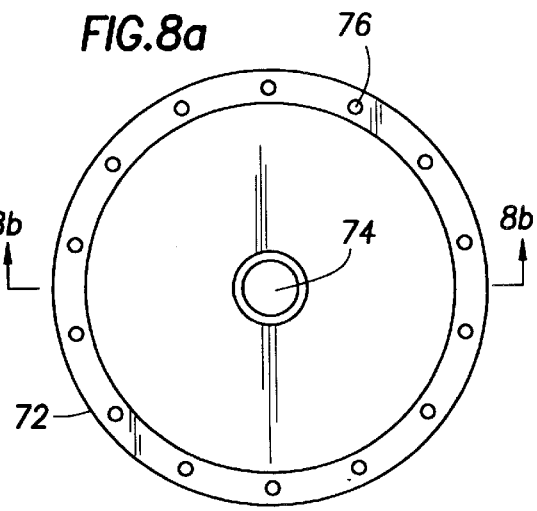
FIG. 8a depicts a top view.
Figure 8B:
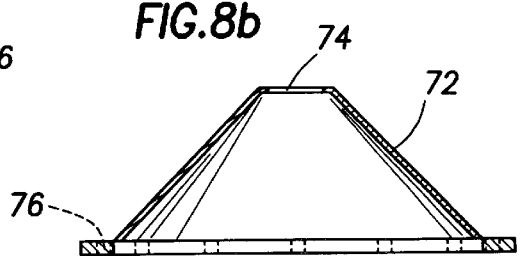
FIG. 8b depicts a side view of a frustoconically shaped pyramid that forms the platform of the present invention.

FIGS. 8a and 8b depict a frustoconical pyramid-type platform 72. This type of platform includes a centrally disposed foam-vent hole 74 and a plurality of radially disposed drain holes 76. In use, foam vents up through the hole 74 and beer drains back into the wort through the drain holes 76. When primary fermentation is substantially complete, one may simply stick a finger through the vent hole 74 and remove the platform 72 with the foam forming a gelid mass on the top surface of the platform.

Figure 10A:
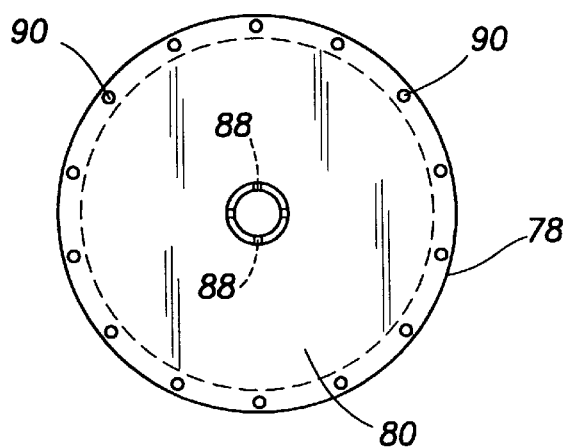
FIG. 10a depicts a top view.
Figure 10B:
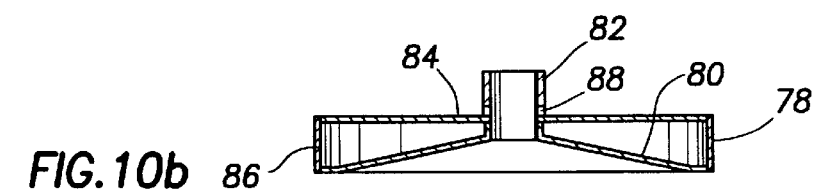
FIG. 10b depicts a side view, of another preferred platform of the present invention.

Finally, turning to FIGS. 10a and 10b, a platform 78 is depicted. This platform comprises a conical bottom 80, a centrally disposed foam-vent chimney 82, and a substantially flat top 84. In this embodiment, the platform also includes a cylindrical wall 86 joining the bottom 80 and the top 84. As before, foam is vented up through the chimney 82 and allowed to settle on the top 84, where it is captured for removal at the end of the primary fermentation stage. In the meantime, beer is allowed to drain through holes 88 in the chimney into the interior of the platform 78 and out the bottom of the platform through a plurality of holes 90.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. An apparatus for use in brewing beer comprising:

a fermentation container comprising an open-top cylinder with an enclosed bottom; and a removable platform positionable upon the top surface of a batch of wort within the container wherein the platform comprises a substantially flat upper plate;

a substantially flat lower plate spaced apart from the upper plate; and a foam-vent chimney between the plates.

2. The apparatus of claim 1 further comprising a beer-drain hole in the upper plate.

3. The apparatus of claim 1 further comprising:

a first valve-rod access hole in the upper plate;

a second valve-rod access hole in the lower plate, the second valve-rod access hole aligned with the first valve-rod access hole; and a valve-rod extending through the first and second valve-rod access holes.

4. The apparatus of claim 3 wherein the valve-rod includes a reduced diameter portion at a lower end of the valve-rod.

5. The apparatus of claim 1 wherein the lower plate is coupled to the chimney by a threaded connection.

6. The apparatus of claim 1 wherein the upper plate is coupled to the chimney by a threaded connection.

7. The apparatus of claim 1 further comprising a plurality of flexible clips to hold the platform in position within the container.

8. The apparatus of claim 1 further comprising a gasket between the lower plate and the container.

9. The apparatus of claim 1 further comprising a handle on the platform.

10. An apparatus for use in brewing beer comprising:

a. a fermentation container comprising an open-top cylinder with an enclosed bottom; and b. a removable platform positionable upon the top surface of a batch of wort within the container wherein the platform comprises i. a substantially flat plate defining an upper surface and ii. a foam-vent chimney on the upper surface of the plate, the chimney defining a vent channel through the plate; and iii. a plurality of drain holes through the chimney.

11. An apparatus for use in brewing beer comprising:

a. a fermentation container comprising an open-top cylinder with an enclosed bottom; and b. a removable platform positionable upon the top surface of a batch of wort within the container wherein the platform comprises a frustoconically shaped basin.

12. The apparatus of claim 11 wherein the basin includes a substantially flat bottom with a drain-hole therethrough.

13. The apparatus of claim 11 wherein the basin defines an upper rim with a foam-vent hole therethrough.

14. The apparatus of claim 11 wherein the basin defines an upper rim with a plurality of arcuate foam-vent holes therethrough.

15. An apparatus for use in brewing beer comprising:

a. a fermentation container comprising an open-top cylinder with an enclosed bottom; and b. a removable platform positionable upon the top surface of a batch of wort within the container wherein the platform comprises an upwardly-pointing cone-shaped pyramid with a foam-vent hole at the top of the cone and a beer-drain hole near the bottom of the cone.

16. An apparatus for use in brewing beer comprising:

a. a fermentation container comprising an open-top cylinder with an enclosed bottom; and b. a removable platform positionable upon the top surface of a batch of wort within the container wherein the platform comprises:

a conically shaped lower plate;

a substantially flat upper plate;

a foam-vent passage between the lower plate and the upper plate;

a cylindrical wall joining the upper plate and the lower plate;

a beer-drain hole in the upper plate; and a beer-drain hole in the lower plate.

\* \* \* \* \*